United States Patent [19]

Iwasaki

[11] Patent Number: 5,521,673
[45] Date of Patent: May 28, 1996

[54] PHOTOMETRIC APPARATUS OF A CAMERA

[75] Inventor: Hiroyuki Iwasaki, Kawasaki, Japan

[73] Assignee: Nikon Corporation, Tokyo, Japan

[21] Appl. No.: 400,126

[22] Filed: Mar. 6, 1995

Related U.S. Application Data

[63] Continuation of Ser. No. 80,238, Jun. 23, 1993, abandoned.

[30] Foreign Application Priority Data

Jul. 6, 1992 [JP] Japan .................................. 4-178299

[51] Int. Cl.⁶ .................................................. G03B 7/08
[52] U.S. Cl. ................................................... 354/432
[58] Field of Search ............................................. 354/432

[56] References Cited

U.S. PATENT DOCUMENTS

| | | | |
|---|---|---|---|
| 4,364,650 | 12/1982 | Terashita et al. | 354/432 |
| 4,412,730 | 11/1983 | Saegusa et al. | 354/432 |
| 4,445,778 | 5/1984 | Nakauchi | 354/432 |
| 4,476,383 | 10/1984 | Fukuhara et al. | 354/432 |
| 4,527,881 | 7/1985 | Sugawara | 354/432 |
| 4,745,427 | 5/1988 | Izumi et al. | 354/432 |
| 4,855,780 | 8/1989 | Hayakawa | 354/432 |
| 4,929,824 | 5/1990 | Miyazaki | 354/432 |
| 4,974,007 | 11/1990 | Yoshida | 354/402 |
| 4,985,726 | 1/1991 | Fujibayashi et al. | 354/432 |
| 5,184,172 | 2/1993 | Miyazaki | 354/432 |
| 5,249,015 | 9/1993 | Takagi et al. | 354/432 |

FOREIGN PATENT DOCUMENTS

| | | |
|---|---|---|
| 0194778 | 9/1986 | European Pat. Off. . |
| 64-72015 | 3/1986 | Japan . |
| 63-292717 | 11/1988 | Japan . |
| 64-72016 | 3/1989 | Japan . |
| 2-280581 | 11/1990 | Japan . |

OTHER PUBLICATIONS

Patent Abstracts of Japan, vol. 13, No. 284 (P–892) 29 Jun. 1989.
Patent Abstracts of Japan, vol. 13, No. 123 (E–733) 27 Mar. 1989.

*Primary Examiner*—Russell E. Adams
*Attorney, Agent, or Firm*—Shapiro and Shapiro

[57] ABSTRACT

A photometric apparatus of a camera comprises a light receiving storage portion generating and accumulating electric charges proportional to intensities of incident rays from a plurality of photometric subareas into which a field is subdivided; a transfer portion transferring electric charges accumulated in the light receiving storage portion in correspondence to the photometric subarea; a voltage converting portion converting the electric charges received from the transfer portion into voltages; a storage gate portion controlling a start and an end of accumulation of electric charges by the light receiving storage portion; a luminance calculating portion calculating luminance values of the photometric subareas based on the voltages of the voltage converting portion; an exposure calculating portion calculating a proper exposure value based on the luminance values obtained by the luminance calculating portion; and a gate control portion controlling the start and the end of the electric charge accumulation by determining photometric subareas making a main contribution to the calculation of the proper exposure value and further determining a drive timing of the storage gate based on a mean value of luminance values of the determined photometric subareas.

13 Claims, 5 Drawing Sheets

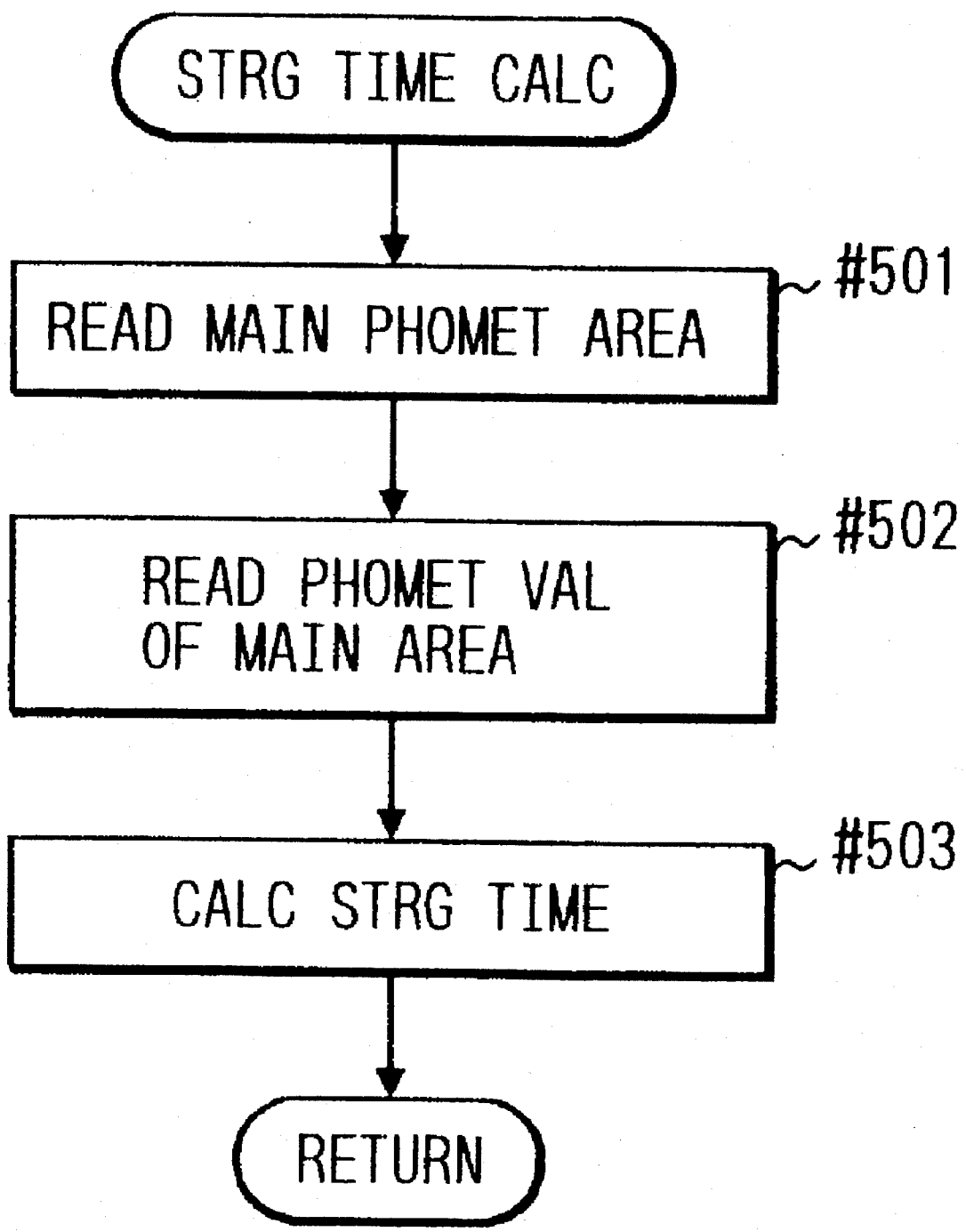

PHOTOMETRIC APPARATUS OF A CAMERA

This is a continuation of application Ser. No. 08/080,238 filed Jun. 23, 1993, now abandoned.

BACKGROUND OF THE INVENTION

1. Field of the Invention

The present invention relates to a photometric apparatus of a camera.

2. Related Background Art

A conventional photometric apparatus of a camera has hitherto, as disclosed in Japanese Patent Application Laid-Open No. 2-280581, added outputs of respective photodetectors, judged whether or not the added value is a predetermined value or under and controlled an exposure time in accordance with the judged result.

There arise, however, the following problems inherent in such an apparatus.

An output value of a photometric circuit has to be adjusted so that an output of the photodetector for a principal subject within a field does not come to a photometric lower limit or under and a photometric upper limit or above. In the above-described apparatus, however, the outputs from the photodetectors for a whole picture are added. It may therefore happen that the output of the photodetector for the principal subject does not fall within a range from the photometric lower limit to the photometric upper limit in a state where the principal subject gets darkest as in the case of back light or in a state where the principal subject gets brightest when illuminated with spot light.

Further, if the field contains something to exert an adverse influence on the photometry as done by the sun, and when the outputs of the whole picture are all added, the principal subject comes in an impossible photometry range.

Moreover, if a luminance value of a given in-field area makes an extremely large contribution to a proper exposure value (as in, e.g., main center photometry and spot photometry), and when the outputs of the whole picture are added, the principal subject does not fall within the photometric range in some cases.

SUMMARY OF THE INVENTION

It is a primary object of the present invention to provide a photometric apparatus capable of preventing such exposure control as to enter an impossible-of-photometry range where a principal subject comes to a photometric lower limit or under and a photometric upper limit or above and of calculating a proper exposure value.

To accomplish the object given above, according to one aspect of the present invention, there is provided a photometric apparatus of a camera, comprising: a light receiving storage portion for generating and accumulating electric charges proportional to light intensities of incident rays from a plurality of photometric subareas into which a field is subdivided; a transfer portion for transferring the electric charges accumulated in the light receiving storage portion; a voltage converting portion for converting the electric charges received from the transfer portion into voltages; a storage gate portion for indicating a start and an end of the accumulation of the electric charges by the light receiving storage portion; a luminance calculating portion for calculating luminance values by use of the voltages of the voltage converting portion; and an exposure calculating portion for calculating a proper exposure value based on luminance values obtained by the luminance calculating portion. This photometric apparatus further comprises a storage time operating means for controlling the start and the end of the electric charge accumulation by the storage gate portion based on a mean luminance value of the photometric subareas which contribute most when calculating the proper exposure value by the exposure calculating means. The output voltage is adjustable to an optimum level by the storage time operating portion.

According to the present invention, the storage time operating portion controls the start and the end of the electric charge accumulation of the storage gate portion in accordance with the mean luminance value based on the photometric subareas by using the luminance value of a set specific area within the field as well as by using the information about an in-field luminance distribution. The storage time operating portion optimizes the output level of the light receiving storage portion on the basis of a luminance value of a specific in-field area on receiving a signal from the exposure calculating portion.

According to the present invention, the storage time operating portion optimizes the output level of the light receiving storage portion on the basis of a luminance value of an in-field area having a predetermined luminance or under on receiving a signal from the exposure calculating portion.

The photometric apparatus according to the present invention includes a photometric subarea setting portion for setting photometric in-field subareas (a spot area and a main center area). The storage time operating portion controls the start and the end of the electric charge accumulation of the storage gate portion in accordance with a mean luminance value based on the photometric subareas set by the photometric subarea setting portion. The output level of the light receiving storage portion is optimized based on the luminance values of the photometric subareas.

According to the present invention, the storage time operating portion controls the start and the end of the electric charge accumulation of the storage gate portion on the basis of a proper exposure value of the last time that is calculated by the exposure calculating portion. The output level of the light receiving storage portion is optimized so that a proper exposure value of the next time does not fluctuate so much from the proper exposure value of the last time.

According to the present invention, the light receiving storage portion accumulates the electric charges in a short time and in a long time, separately. A dynamic range of the photometric range is thus set wide. The optimum exposure value is obtained based on the result thereof.

According to the present invention, after the dynamic range is once set wide, the optimum exposure value is obtained in the dynamic range in accordance with a proper exposure of the subject.

According to the present invention, the photometric process is conducted in a predetermined storage time at the start of photometry, whereby the dynamic range of the photometric range can be set wide.

According to the present invention, the storage time operating portion receives the information about the area which contributes most to the exposure calculation from the exposure calculating portion. The storage time operating portion is capable of adjusting the output voltage level of the photodetector. It is therefore possible to obtain the optimum output level without that the principal subject comes to the photometric lower limit or under and the photometric upper limit or above even in the following cases:

(1) a case where the principal subject gets darkest as in the case of back light and brightest when illuminated with spot light;

(2) a case where the field contains an object which exerts an adverse influence on the photometry as done by the sun;

(3) a case where a luminance value of a specific infield field area makes an extremely large contribution to the proper exposure value; and (4) a case where the principal subject within the field deviates remarkably from a mean value of the whole picture, and the principal subject can not be set at the optimum level if the output level is determined based on the mean value of the whole picture.

BRIEF DESCRIPTION OF THE DRAWINGS

Other objects and advantages of the present invention will become apparent during the following discussion in conjunction with the accompanying drawings, in which:

FIG. 6 is a flowchart showing subroutines to calculate a storage time in the embodiment.

DESCRIPTION OF THE PREFERRED EMBODIMENTS

Figure 1:
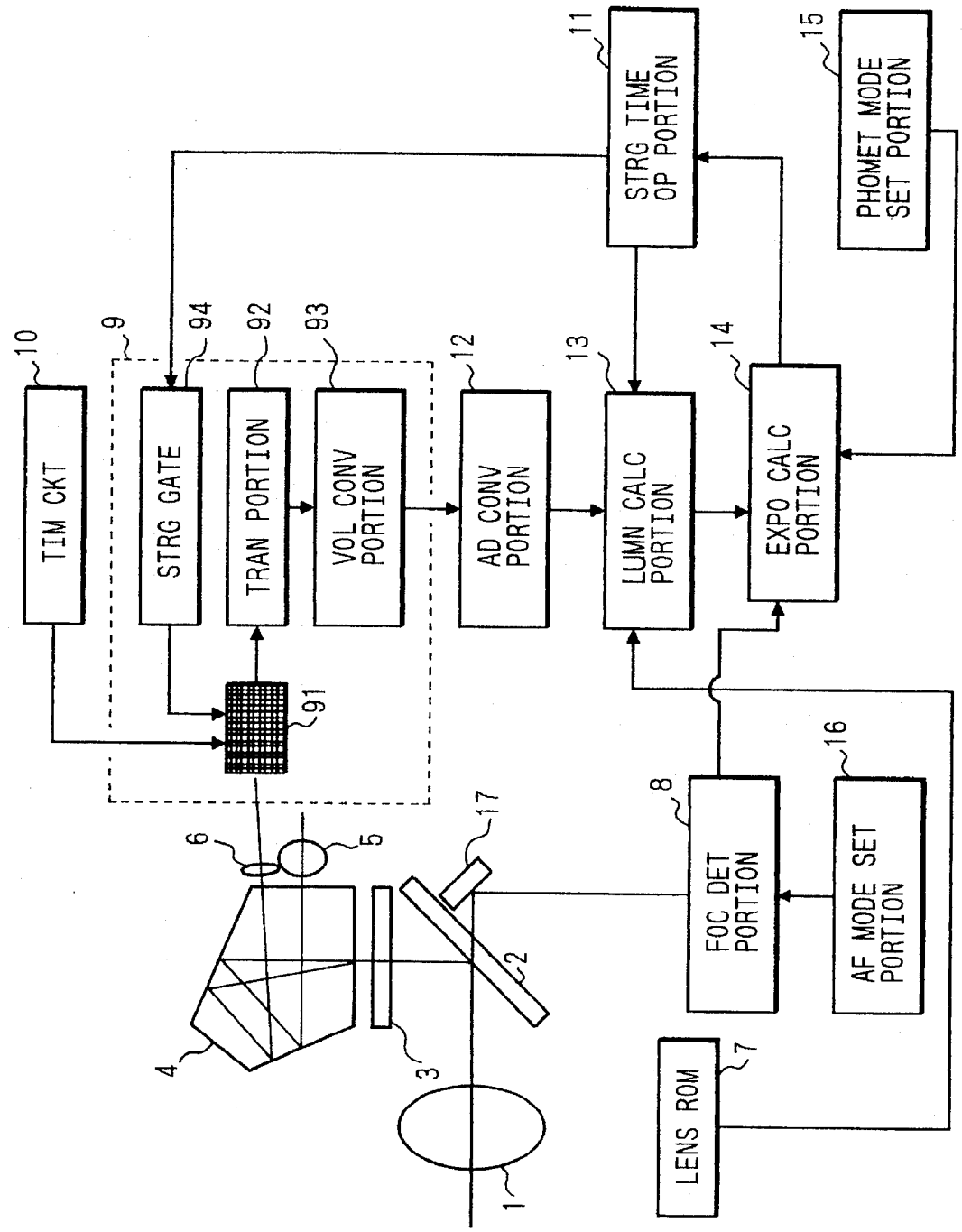
FIG. 1 is a block diagram illustrating a construction of an embodiment of the present invention.

FIG. 1 is a block diagram illustrating a construction of an embodiment according to the present invention.

A luminous flux passing through a photographing lens 1 reaches an eye of a photographer via a main mirror 2, a diffuse screen 3, a pentaprism 4 and an eyepiece 5. A part of luminous flux which has been diffused by the diffuse screen 3 travels through the pentaprism 4 and a photometric lens 6 and reaches a photodetector 9.

Figure 3:
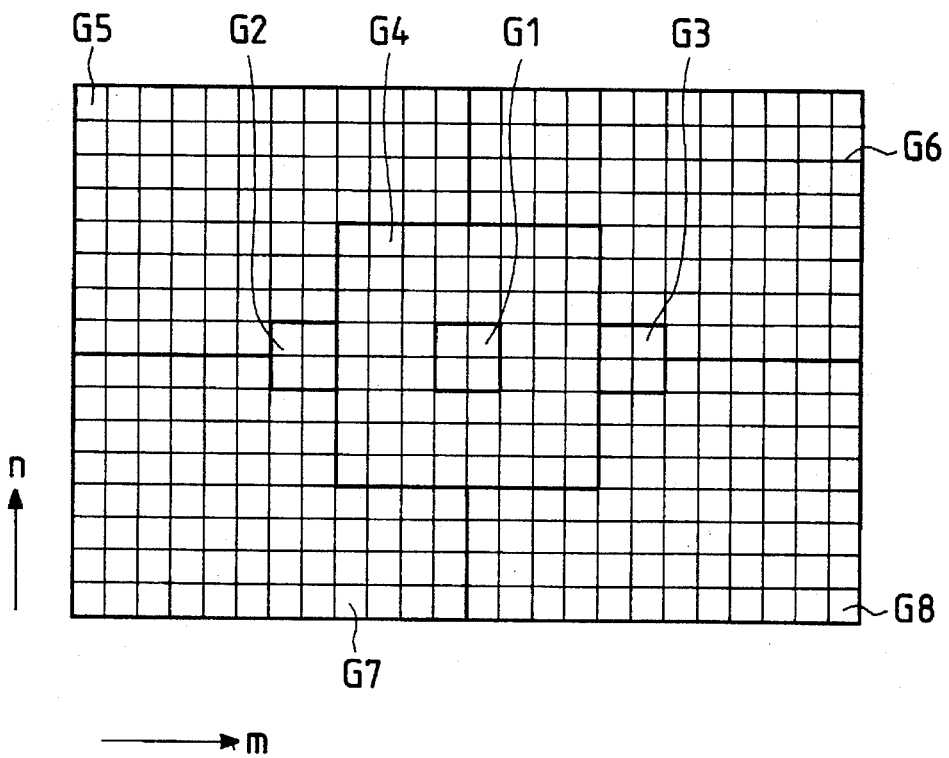
FIG. 3 is a diagram showing how photometric subareas are grouped in accordance with the embodiment.

The photodetector 9 is defined as a storage type light receiving element such as, e.g., a CCD sensor. The photodetector 9 is constructed of a light receiving storage portion 91, a transfer portion 92, a voltage converting portion 93 and a storage gate portion 94. The light receiving storage portion 91 includes a plurality (24×16=384) of light receiving segments arrayed in matrix wherein twenty four pieces of segments are arranged horizontally, while sixteen pieces of segments are arranged vertically. Electric charges generated in the respective segments are stored in the light receiving storage portion 91. The light receiving storage portion 91 also performs a photometric process with respect to a field corresponding Just to a photographic picture. Note that FIG. 3 illustrates subdivided photometric subareas collated on the field.

A timing circuit 10 supplies a transfer portion 92 with clock pulses needed for transferring the electric charges. The electric charges accumulated in the light receiving storage portion 91 are transferred pixel by pixel to the voltage converting portion 93. The voltage converting portion 93 converts 384 pixel electric charge signals into the same number of voltage level values. The thus converted values are outputted from an output terminal thereof to an A/D converting portion 12. The storage gate portion 94 is a gate for issuing, upon receiving signals from a storage time operating portion 11, commands to start and end the accumulation of electric charges to the light receiving storage portion 91. The start and the end of the accumulation of electric charges are controlled by transmitting pulse signals to this gate.

The A/D converting portion 12 converts voltage signals given from the photodetector 9 into recognizable-by-computer numeric signals and outputs the signals to a luminance calculating portion 13.

In the luminance calculating portion 13, 384 pieces of luminance values BV (m, n) are obtained by the following formula 1:

$$BV(m, n) = V \times k(m, n)/t \qquad (1)$$

where $k(m, n)$ is the information on the photographing lens which has been inputted from an intra-lens ROM 7, t is the storage time inputted from the storage time operating portion 11, and V is the signal transmitted from the A/D converting portion 12.

Note that the luminance value BV (m, n) indicates a subarea located both in the mth position from left and in the nth position from under among the plurality of photometric subareas in matrix in FIG. 3. Further, the information $k(m, n)$ about the photographing lens is a correction factor intrinsic to each photometric subarea in the photographing lens that is obtained from an open F-number, an exit pupil position and a piece of vignetting information.

On receiving signals from the luminance calculating portion 13, a focus detecting portion 8 and a photometric mode setting portion 15, an exposure calculating portion 14 effects an exposure arithmetic to calculate a proper exposure value.

The photometric mode setting portion 15 is a means for selecting any one of photometric modes such as a multi-pattern photometric mode to perform the exposure arithmetic by use of a luminance value of the whole field, a main central photometric mode to effect the exposure arithmetic by executing a photometric process mainly in the vicinity of the center of the field and a spot photometric mode to perform the exposure arithmetic by executing the photometric process with respect to a hyperfine subarea of the central part of the field. Note that a method of calculating the exposure will be explained later with reference to FIG. 5.

Figure 2:
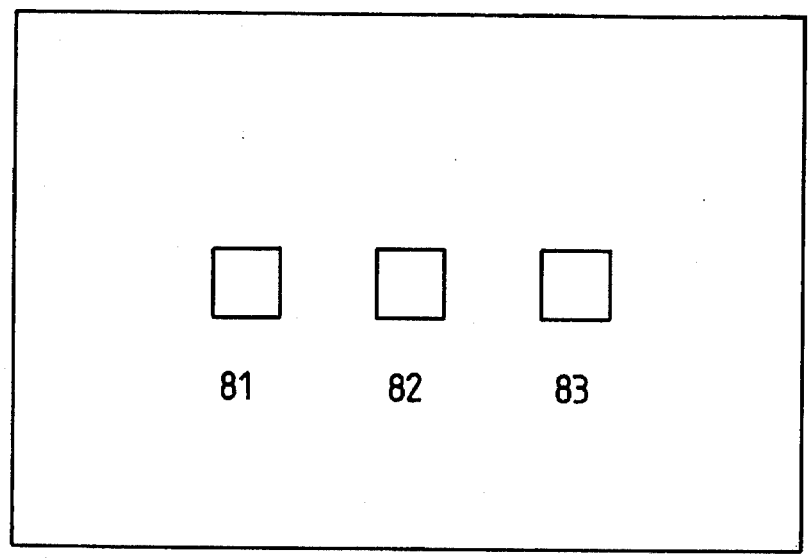
FIG. 2 is a diagram showing focus detection areas in the embodiment.

The focus detecting portion 8 detects a focus of a part of luminous flux passing through the photographing lens 1 as well as through the main mirror 2 and led to a submirror 17 with respect to each of three focus detection areas 81, 82, 83 within the photographing picture shown in FIG. 2 by a known phase difference detection method. One area is selected from those areas. The photographing lens 1 is driven by an unillustrated motor so that the selected area is brought into an in-focus state. The method of selecting the area includes a shortest range priority method of selecting the shortest range area from the photographer and a present state priority method of selecting a smallest defocus quantity area.

Further, the AF mode setting portion 16 is a means serving not to automatically determine any one of the focus detection areas 81, 82, 83 but to provide an artificial selection thereof. If any one of the three areas is set, the set focus detection area is to be selected irrespective of a detected result of each focus detection area.

A signal transmitted from the exposure calculating portion 14 is inputted to the storage time operating portion 11. Based on this signal, the storage time operating portion 11 calculates an optimum storage time (3) of the photodetector 9 which will hereinafter be explained. The storage time operating portion 11 controls the storage time through the storage gate 94 of the photodetector 9.

<<Explanation of the Necessity for Operating the Storage Time>>

Given next is an explanation of the necessity for operating the storage time of the photodetector 9 by means of the storage time operating portion 11.

Generally, a photometric range demanded by the photometric apparatus of the camera is EV0–EV20, i.e., on the order of 20 EV in terms of a dynamic range. In the CCD of nowadays, however, the dynamic range is on the order of 10 EV at the maximum. Then, there arises the necessity for setting the demanded photometric range at an optimum level including the principal subject by operating the CCD storage time.

Concretely, when a luminance value in the field is EV0–EV20, an illuminance on the surface of the photodetector is approximately 0.01 Lx–10000 Lx. A sensitivity of the photodetector is about 20 V/Lx×Sec. A saturation output is approximately 2 V, and, therefore, the photometric range is about EV10–EV20 when the storage time is 10 µSec. The photometric range is EV0–EV10 when the storage time is 10 mSec. Namely, the dynamic range of EV0–EV20 defined as a photometric range demanded by the photometric apparatus of the camera can not be attained till the storage time of the photodetector is controlled to 10 µSec and 10 mSec.

Note that when the photometric process is conducted by use of the CCD for the reason elucidated above, the photometric range in the photometric process effected once is limited to a range of 10 EV. A dynamic range of a silver halide film is, however, smaller than 10 EV, and hence no problem is caused.

<<Explanation of Main Algorithm>>

Figure 4:
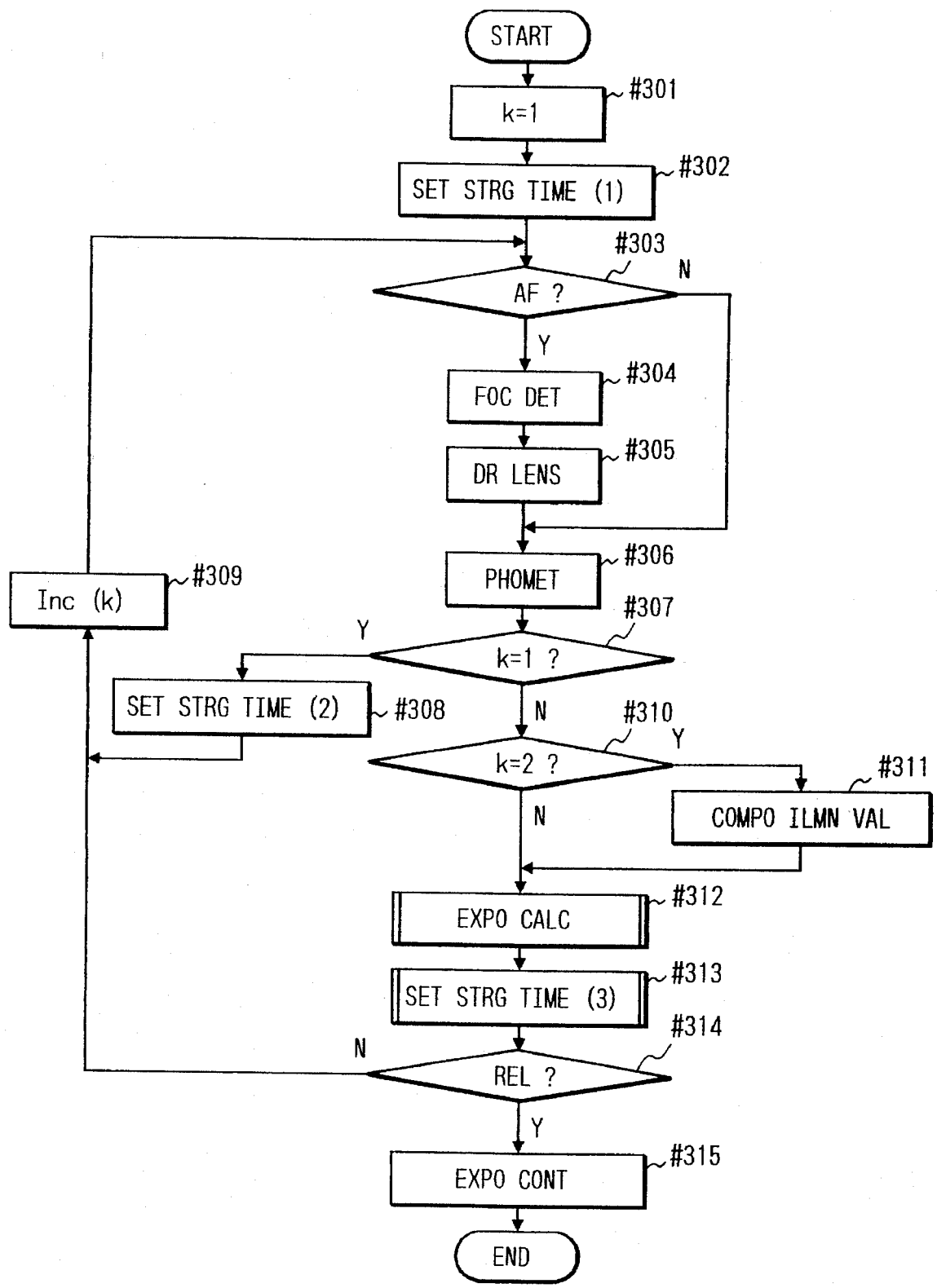
FIG. 4 is a flowchart showing a main algorithm in the embodiment.

FIG. 4 is a flowchart showing a main algorithm according to the present invention. An explanation will hereinafter be given for each step.

301: k is set to an initial value, i.e., 1.

302: The storage time t(1) is set to the initial value. The storage time t(1) of the initial value is, it is assumed, 10 µSec. Accordingly, a possible photometry range of the photodetector 9 is EV10–EV20.

303: Judged is whether or not the camera is set in an AF mode by an unillustrated AF (Auto Focus)-MF (Manual Focus) changeover switch, viz., whether a focus adjustment is automated or not. If automated, the action proceeds to #304. Whereas if not automated, the action proceeds to #306.

304: If the focus adjustment is automated, the focus detecting portion 8 detects the focus. An in-focus area is selected from the focus detection areas 81, 82, 83 by the shortest range priority method and the present state priority method.

Further, when any one of the focus detection areas 81, 82, 83 is selected by the AF mode setting portion 16, the focus is detected in that single area.

305: The photographing lens 1 is driven by an unillustrated motor to provide an in-focus state of the focus detection area selected in #304.

306: After the focus has been adjusted automatically or manually, the photometric process is performed according to the set storage time, and 384 luminance values are stored in a predetermined memory.

Note that the set storage time may be the storage time t(1) set in #302 or a storage time t(2) set in #308 which will be mentioned later or a storage time t(3) set in #313 which also hereinafter be stated. #307: Judged is whether or not k is 1, i.e., whether k remains initialized or not. If k=1, the action proceeds to #308. Whereas if k≠1, the action proceeds to #310.

308: When k=1, the storage time t(2) of the second photometric process is set. In this instance, the storage time t(2) is 10 mSec. Therefore, the possible of photometry range of the photodetector 9 is EV0–E10.

309: k is incremented, i.e., k=k+1. Then, the action goes back again to #303. #310: When k≠1, the action is to judge whether k is 2 or not. When k=2, the action proceeds to #311. When k≠2, the action proceeds to #312. #311: When k≠2, the luminance values are composited. Namely, the possible photometry range of the photodetector 9 is EV10–EV20 when k=1 but is EV0–EV10 when k=2. Based on the results of these two photometric processes, luminance values are created, wherein the dynamic range is EV0–EV20. Concretely, there are read 384 pieces of luminance values accumulated in #311 when k=2. The luminance values are composited with respect to the areas exhibiting EV10 or under, wherein the luminance values when k=2 are conceived as photometric results.

Note that the action described in #311 is conducted once after the start.

312: An exposure is calculated by the exposure calculating portion 13 on the basis of the luminance values, thus obtaining a proper exposure value BVans. An exposure calculating method will be described in greater detail with reference to FIG. 5.

313: The storage time t(3) employed in the next photometric process (#306) is calculated by the storage time operating portion 11. In this arithmetic, the storage time t(3) is calculated by use of a main area obtained in #411 which will be mentioned later. A storage time calculating method will be explained in greater detail with reference to FIG. 6.

314: Whether an unillustrated release button is depressed or not is judged. If not depressed, the action proceeds to #309 where k is incremented, and the action returns to #303. Whereas if depressed, the action proceeds to #315.

315: Based on the result of the exposure calculation performed in #312, the exposure is controlled by a stop and an unillustrated shutter as well.

Incidentally, the initial value of the storage time t(1) is set to 10 µSec in #302, while the storage time t(2) is set to 10 mSec in #308. However, the storage time t(1) may be set to 10 mSec, while the storage time t(2) may be also set to 10 µSec. Further, if the dynamic range is satisfied by the storage time t(1) set only once in #302 (e.g., the luminance of the subject all falls within 10 EV–20 EV), the photometric process of the storage time t(2) may not be performed in #308 by setting k such as k=2.

<<Explanation of Exposure Calculation>>

Figure 5:
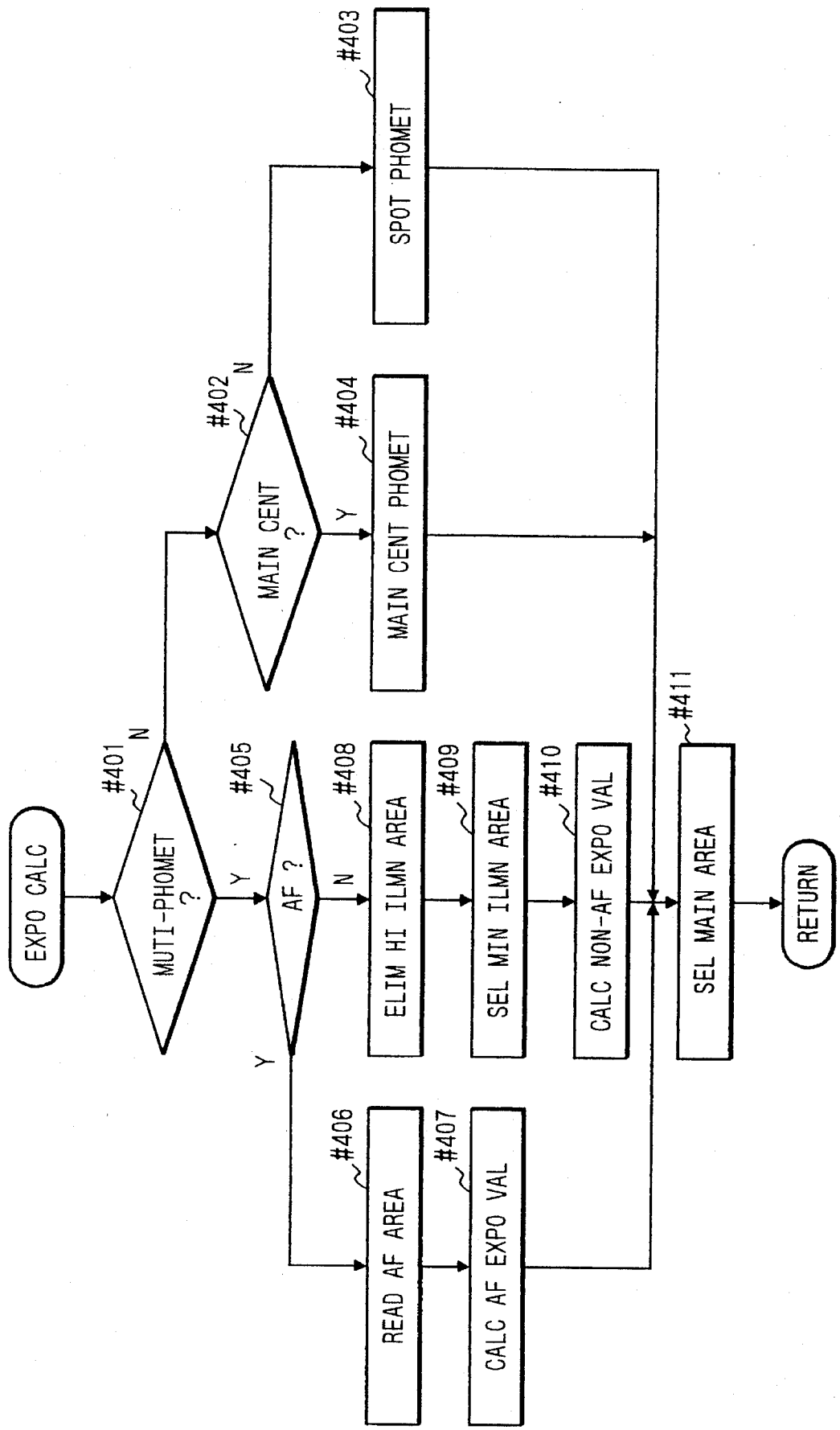
FIG. 5 is a flowchart showing subroutines to calculate an exposure in the embodiment.

FIG. 5 is a flowchart showing subroutines of the exposure calculation by the exposure calculating portion 13 in the embodiment. An explanation will hereinafter be given for each step.

401: Judged is whether or not the photometric mode is set to multi-pattern photometry by the photometric mode setting portion 15. If not set to the multi-pattern photometry, the action proceeds to #402. Whereas if set thereto, the action proceeds to #405.

402: Judged is whether or not the photometric mode is set to main center photometry by the photometric mode setting portion 15. If not set to the main center photometry, the action proceeds to #403. If set thereto, the action proceeds to #404.

403: A spot luminance value is substituted as a proper exposure value BVans. The spot luminance value is given by a mean value of luminance values BV(12, 8), BV(13, 8), BV(12, 9), BV(13, 9) in a group G1 area encircled with a bold-line frame and composed of photometric subareas (12, 8), (13, 8), (12, 9), (13, 9) in FIG. 3.

Note that a photometric subarea (X, Y) indicates a subarea located in the Xth position from left and in the Yth position from under among the photometric subareas shown in FIG. 3. Concretely, the spot luminance value is obtained by substituting m0=12, m1=13, n0=8, n1=9, k=4 into the formula 2. Thereafter, the action proceeds to #411.

$$BVans = \left\{ \sum_{n=n0}^{n1} \sum_{m=m0}^{m1} BV(m,n) \right\} / k \qquad (2)$$

404: The main center luminance value is substituted as a proper exposure value BVans. The main center value is given by a mean value of luminance values of an area defined by photometric subareas (9, 5), (16, 5), (16, 12), (9, 12) that are disposed at four corners, i.e., the luminance values of a squared group G4 area with a bold-line frame. Concretely, the main center luminance value is obtained by substituting m0 =9, m1=16, n0=12, k=64 into the formula 2. Thereafter, the action proceeds to #411.

405: If in the multi-pattern photometry, the action is to judge whether the focus adjustment is conducted automatically or manually by the unillustrated AF–MF changeover switch. If automatic, the action proceeds to #406. If manual, the action goes forward to #408. #406: If the focus adjustment is set automatic, there is read a focus detection area selected based on the information of the focus detecting portion 8 and the AF mode setting means 16.

407: An exposure calculation value is obtained based on positional information of the focus detection area read in #406 in the following manner. To start with, corresponding spot photometric subareas are selected from the position of the selected focus detection area. That is, if the selected focus area is the area 81 shown in FIG. 2, the group G2 area with the bold-line frame in FIG. 3 is selected as the spot photometric subareas. Similarly, if the focus area is the area 82, the group G1 area is selected. If the focus area is the area 83, the group G3 area is selected.

Then, luminance values of the selected spot photometric subareas are similarly obtained by the formula 2 as done in #403. Subsequently, a mean value of the luminance values of the entire picture is similarly obtained by the formula 2. The mean value thereof is set as a proper exposure value BVans. Thereafter, the action proceeds to #411.

408: If the focus adjustment is manual, the luminance values of the 384 subareas are retrieved. Not less than EV16 luminance values of the photometric subareas are made invalid. This is derived from the fact that an object exhibiting an ultra high luminance of EV16 or larger is not, it has been empirically known, substantially eligible for a principal subject.

Then, in the calculations which will be effected thereafter, those ultra high luminance subareas are eliminated from the photometric subareas but not included in the total number of pixels.

409: A mean luminance value from the group G4 area to a group G8 area in FIG. 3 is calculated by use of the same formula 2 as that in #403. An area having the lowest luminance is selected from those areas.

410: Set as a proper exposure value BVans is a mean value between a mean luminance value, obtained by the formula 2, of the lowest luminance group area selected in #409 and a mean luminance value, obtained by the formula 2, of the entire field. Thereafter, the action proceeds to #411.

411: An area making a main contribution to the exposure calculation is selected. More specifically, if the photometric mode is the spot photometry, the group G1 area (#403) is selected as a main area. If the mode is the main center photometry, the group G4 area is selected (#404) as a main area. If the mode is the multi-pattern photometry, whether the mode is the AF mode or not is further judged. When the focus adjustment is automatic, the selected AF area obtained in #406 among the areas 81–83 is selected as a main area. When the focus adjustment is manual, the area obtained in #409 is selected as a main area.

<<Explanation of Method of Calculating Optimum Storage Time>>

FIG. 6 iS a flowchart showing subroutines for calculating an optimum storage time in the storage time operating portion 11 in accordance with this embodiment. An explanation will hereinafter be given for each step.

501: Read is the group area selected in #411, i.e., obtained by the exposure calculating portion 14 and making the main contribution to the exposure calculation.

502: A mean luminance value BVmean of the group area read in #501 is read from the exposure calculating portion 14.

503: An optimum storage time tm is obtained by the following formula 3.

$$tm = Vh / \{ S \times 0.01 \times 2 \exp(BV\text{mean}) \} \qquad (3)$$

Unit: second (Sec)

where

Vh: (photodetector saturation voltage)/2

Unit: (V), and

S: photodetector sensitivity

Unit: (V/L×X Sec)

In the formula 3, 0.01 is the constant for indicating what degree of Lx on the photodetector surface to be equivalent to the luminance value EV0 in the field. Further, the unit of BVmean is (EV), and, therefore, tm obtained in the formula 3 is given in the form of such a storage time that the field area having a luminance value identical with BVmean is just ½ as small as the saturation level of the luminance value.

Next, a second method of obtaining the optimum storage time will be described. At the first onset, the latest proper exposure value BVans is read from the exposure calculating portion 14. The latest proper exposure value BVans based on the unit of EV has already been obtained in #312 in the flowchart of FIG. 4. Next, the optimum storage time tm is obtained by the following formula 4.

$$tm = \frac{Vmax \times 2\exp(-5)}{s \times 0.01 \times 2\exp(BVans)} \qquad (4)$$

Unit: second (Sec)

where Vmax×2exp (−5) indicates the voltage smaller by 5 EV than the maximum voltage value Vmax which can be outputted from the photodetector 9, i.e., the voltage that is 1/32 as small as the maximum voltage value Vmax. The reason for this is that the photometric range of the photodetector 9 is set to 10 EV (10th power of 2), and hence the luminance BVans to be metered most is set as an intermediate therebetween.

The photometric process in the camera is repeatedly effected at extremely short time-intervals. It can be therefore predicted that the proper exposure value BVans in the next photometric process is approximate to the proper exposure value BVans of the last time. Hence, it is effective to perform the photometry with respect to the luminance range with the proper exposure value BVans being centered even in the next photometric process. According to the formula 4, the photometric range in the next photometric process can be set to plus or minus 5 EV of the proper exposure value BVans of the last time. The most effective storage time can be therefore set.

As discussed above, according to the present invention, it is possible to adjust the output voltage level of the photodetector receiving the information of the area which contributes most to the exposure calculation. Even in a case where the principal subject gets darkest as in the case of the back light, the optimum output level can be obtained without that the principal subject comes to the photometric lower limit or under and a photometric upper limit or above.

It is apparent that, in this invention, a wide range of different working modes can be formed based on the invention without deviating from the spirit and scope of the invention. This invention is not restricted by its specific working modes except being limited by the appended claims.

What is claimed is:

1. A photometric apparatus of a camera, comprising:
    a light receiving storage portion for generating and accumulating electric charges proportional to light intensities of incident rays from a plurality of photometric subareas into which a field is subdivided;
    a transfer portion for transferring said electric charges accumulated in said light receiving storage portion in correspondence to said photometric subareas;
    a voltage converting portion for converting said electric charges received from said transfer portion into voltages;
    a storage gate portion for controlling a start and an end of the accumulation of said electric charges by said light receiving storage portion;
    a luminance calculating portion for calculating luminance values of said photometric subareas based said voltages of said voltage converting portion;
    an exposure calculating portion for calculating a proper exposure value based on said luminance values calculated by said luminance calculating portion; and
    a gate control portion for controlling the start and the end of the electric charge accumulation by determining said photometric subareas making a main contribution to the calculation of said proper exposure value and further determining a drive timing of said storage gate portion based on a mean value of luminance values of said determined photometric subareas.

2. The photometric apparatus of the camera according to claim 1, wherein said camera includes a determining portion for determining, as a focus detection area, one of a plurality of areas into which the field is divided, and said gate control portion controls the start and the end of the electric charge accumulation by determining the drive timing of said storage gate portion in accordance with a mean luminance value based on said photometric subareas corresponding to said focus detection area determined by said determining portion.

3. The photometric apparatus of the camera according to claim 1, wherein said gate control portion controls the start and the end of the electric charge accumulation by selecting predetermined subareas from said plurality photometric subareas based on information about a field luminance distribution and determining the drive timing of said storage gate portion on the basis of a mean luminance value of said selected photometric subareas.

4. The photometric apparatus of the camera according to claim 3, wherein said selected subareas have luminance values which are each equal to a predetermined value or under.

5. The photometric apparatus of the camera according to claim 1, further comprising a selecting portion for selecting predetermined subareas from said plurality of photometric subareas, wherein said gate control portion controls the start and the end of the electric charge accumulation by determining the drive timing of said storage gate portion based on a mean luminance value of said photometric subareas selected by said selecting portion.

6. The photometric apparatus of the camera according to claim 1, wherein said gate control portion controls the start and the end of the electric charge accumulation by determining the drive timing of said storage gate portion based on the basis of said proper exposure value calculated by said exposure calculating portion.

7. A photometric apparatus of a camera, comprising:
    a light receiving storage portion for generating and accumulating electric charges proportional to light intensities of incident rays from a plurality of photometric subareas into which a field is subdivided;
    a transfer portion for transferring said electric charges accumulated in said light receiving storage portion in correspondence to said photometric subareas;
    a voltage converting portion for converting said electric charges received from said transfer portion into voltages;
    a storage gate portion for controlling a start and an end of the accumulation of said electric charges by said light receiving storage portion;
    a luminance calculating portion for calculating luminance values of said photometric subareas based on said voltages of said voltage converting portion;
    an exposure calculating portion for calculating a proper exposure value based on said luminance values calculated by said luminance calculating portion; and
    a gate control portion for controlling the start and the end of the electric charge accumulation by driving said storage gate portion and thus setting at least two kinds of electric charge storage time, wherein said exposure calculating portion calculates a proper exposure value based on photometric processes for at least said two kinds of electric charge storage time.

8. The photometric apparatus of the camera according to claim 7, wherein said gate control portion sets said one kind of electric charge storage time after said exposure calculating portion has calculated the proper exposure value.

9. A photometric apparatus of a camera, comprising:
    a light receiving storage portion for generating and accumulating electric charges proportional to light intensities of incident rays from a plurality of photometric subareas into which a field is subdivided;
    a transfer portion for transferring said electric charges accumulated in said light receiving storage portion in correspondence to said photometric subareas;
    a voltage converting portion for converting said electric charges received from said transfer portion into voltages;
    a storage gate portion for controlling a start and an end of the accumulation of said electric charges by said light receiving storage portion;

a luminance calculating portion for calculating luminance values of said photometric subareas based on said voltages of said voltage converting portion;

an exposure calculating portion for calculating a proper exposure value based on said luminance values calculated by said luminance calculating portion; and a gate control portion for controlling the start and the end of the electric charge accumulation by driving said storage gate portion and thus setting at least two kinds of electric charge storage time, wherein said gate control portion controls the start and the end of the electric charge accumulation of said light receiving storage portion by determining the drive timing of said storage gate portion so that said first electric charge storage time becomes a predetermined electric charge storage time.

10. The photometric apparatus of the camera according to claim 9, wherein said predetermined electric charge storage time is two kinds of time having lengths different from each other.

11. A photometric apparatus of a camera, comprising:

a light receiving storage portion which generates and accumulates electric charges proportional to light intensities of incident rays from a plurality of photometric subareas into which a field is subdivided;

a transfer portion which transfers said electric charges accumulated in said light receiving storage portion in correspondence to said photometric subareas;

a voltage converting portion which converts said electric charges received from said transfer portion into voltages;

a storage gate portion which controls a start and an end of the accumulation of said electric charges by said light receiving storage portion;

a luminance calculating portion which calculates luminance values of said photometric subareas based on said voltages of said voltage converting portion;

an exposure calculating portion which calculates a proper exposure value based on said luminance values calculated by said luminance calculating portion; and a gate control portion which calculates the start and the end of the electric charge accumulation by determining said photometric subareas making a main contribution to the calculation of said proper exposure value and further determining a drive timing of said storage gate portion based on a mean value of luminance values of said determined photometric subareas.

12. A photometric apparatus of a camera, comprising:

a light receiving storage portion which generates and accumulates electric charges proportional to light intensities of incident rays from a plurality of photometric subareas into which a field is subdivided;

a transfer portion which transfers said electric charges accumulated in said light receiving storage portion in correspondence to said photometric subareas;

a voltage converting portion which converts said electric charges received from said transfer portion into voltages;

a storage gate portion which controls a start and an end of the accumulation of said electric charges by said light receiving storage portion;

a luminance calculating portion which calculates luminance values of said photometric subareas based on said voltages of said voltage converting portion;

an exposure calculating portion which calculates a proper exposure value based on said luminance values calculated by said luminance calculating portion; and a gate control portion which controls said start and the end of the electric charge accumulation by driving said storage gate portion and thus setting at least two kinds of electric charge storage time, wherein said exposure calculating portion calculates a proper exposure value based on photometric processes for at least said two kinds of electric charge storage time.

13. A photometric apparatus of a camera, comprising:

a light receiving storage portion which generates and accumulates electric charges proportional to light intensities of incident rays from a plurality of photometric subareas into which a field is subdivided;

a transfer portion which transfers said electric charges accumulated in said light receiving storage portion in correspondence to said photometric subareas;

a voltage converting portion which converts said electric charges received from said transfer portion into voltages;

a storage gate portion which controls a start and an end of the accumulation of said electric charges by said light receiving storage portion;

a luminance calculating portion which calculates luminance values of said photometric subareas based on said voltages of said voltage converting portion;

an exposure calculating portion which calculates a proper exposure value based on said luminance values calculated by said luminance calculating portion; and a gate control portion which controls the start and the end of the electric charge accumulation by driving said storage gate portion and thus setting at least two kinds of electric charge storage time, wherein said gate control portion controls the start and the end of the electric charge accumulation of said light receiving storage portion by determining the drive timing of said storage gate portion so that said first electric charge storage time becomes a predetermined electric charge storage time.

* * * * *